UNITED STATES PATENT OFFICE.

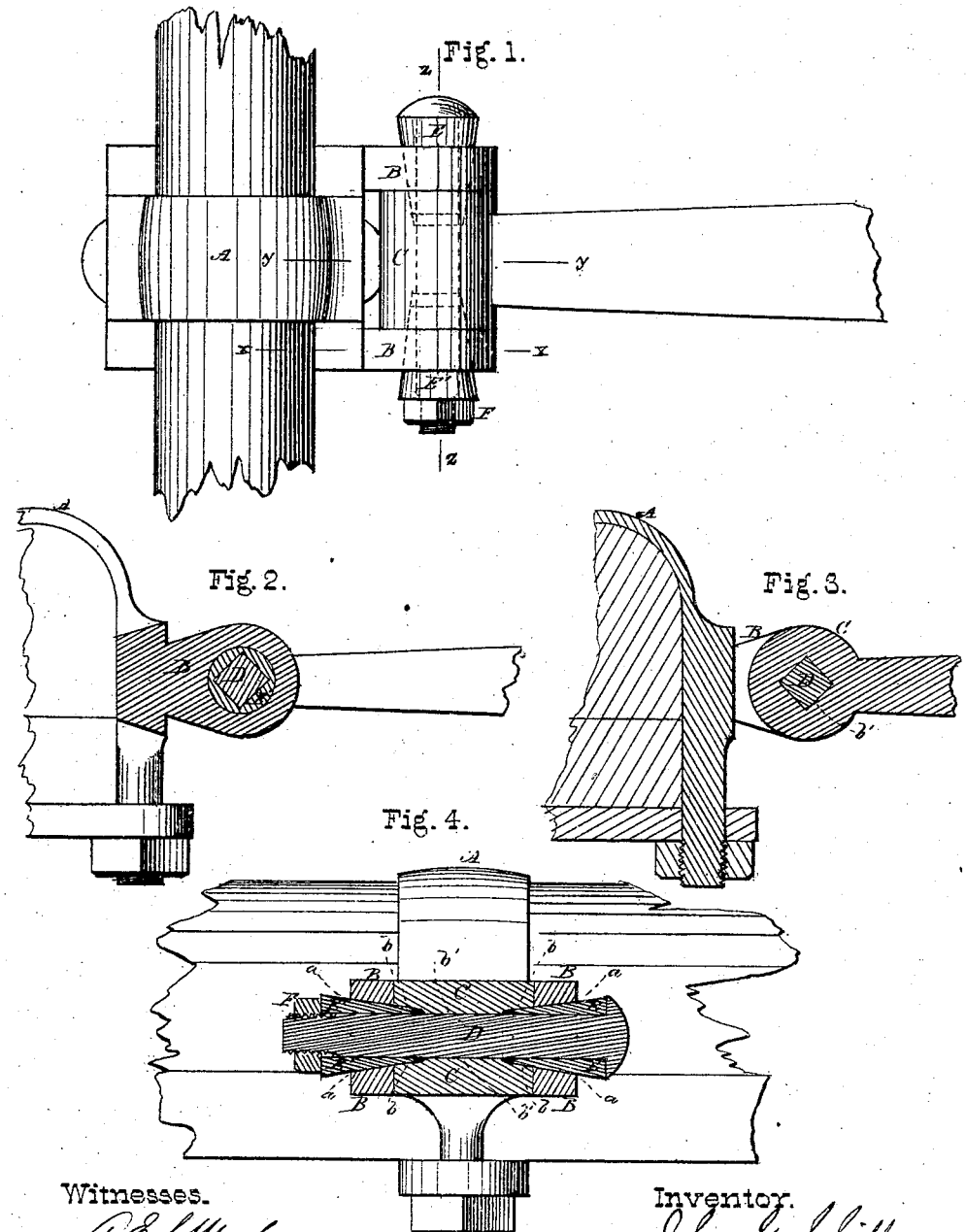

JOHN G. SCHILLER, OF YOUNGSTOWN, OHIO.

IMPROVEMENT IN THILL-COUPLINGS.

Specification forming part of Letters Patent No. 130,945, dated August 27, 1872.

*To all whom it may concern:*

Be it known that I, JOHN G. SCHILLER, of Youngstown, in the county of Mahoning and in the State of Ohio, have invented certain new and useful Improvements in Thill-Couplings; and do hereby declare that the following is a full, clear, and exact description thereof, reference being had to the accompanying drawing making a part of this specification, in which—

Figure 1 is a top plan view of my invention; Fig. 2, a vertical section of the coupling on the line $x$ $x$ of Fig. 1; Fig. 3, a vertical section of the same on the line $y$ $y$ of Fig. 1; and Fig. 4, a horizontal section of the same on the line $z$ $z$ of Fig. 1.

Like letters of like kind denote similar parts in each figure.

The nature of my invention relates to improvements in thill-couplings, whereby the pivotal joint may be tightened up from time to time to compensate for wear, the rattling of the parts avoided, and the thills readily attached and detached; and consists in the construction and combination of the several devices employed, so arranged as to effect the above-named purposes, and all as more fully hereinafter described and set forth.

In the drawing, A represents the body of the coupling having two ears, B, constructed alike, arranged opposite to each other, and provided each with a circular opening, $a$, largest upon the outside, and tapering regularly toward the inside of each ear. The head C of the thill-iron fits closely between said ears, and is provided with an opening, $b$, which, when said iron is in position, coincides with the opening $a$ in said ears. This opening $b$ is circular upon the outside of the thill-iron, corresponding in size at that point with the opening $a$, upon the inside of the ears B, and extends in a circular form tapering regularly inward upon the same slope as that of the opening $a$ for about one-third of the length of said opening $b$ at each end thereof. The remainder and central portion $b'$ of this opening is square in form. A pin, D, having a square shank and screw-threads at one of its ends, of a size corresponding to the square part $b'$ of the opening $b$, and of a length sufficient to pass through the openings $a$ and $b$, has fitting upon it two thimbles, E and E'. These thimbles are conical in form, with their tapering outsides corresponding with the lines of the opening $a$ and the circular portion of the opening $b$. These thimbles have a rectangular opening through them lengthwise, corresponding with the size and form of the shank of the pin D. A nut, F, fits upon the threaded end of the pin D, and serves to secure said pin and thimbles in place.

When the coupling is put together the head C of the thill-iron is placed between the ears B, and the pin D, having the thimble E first placed upon it, is inserted through the openings $a$ $b$ $b'$, the thimble E' then placed upon said pin, and the whole secured by the nut F. In this position the inner ends of the thimbles should not reach quite as far as the ends of the opening $b'$. The thill-iron in its movement will turn the pin D, the thimbles E E', and the nut F simultaneously, and for that reason the nut will not work itself loose, and need not be screwed up very tightly. The friction will be upon the conical thimbles, and as these wear their inner ends may be filed off a little. In this way there will be a constantly tight pivotal joint, the coupling may be readily attached and detached, and in operation it will not rattle.

Having thus described my invention, what I claim as new therein, is—

The thill-coupling having the conically-perforated lugs B, the conically-recessed thill-iron C, and the adjustable hard-iron thimbles E E' surrounding the screw-bolt D, said thimbles having conical surfaces extending through and fitting the conical perforations of the said lugs, and inserted into the conical recesses of said thill-iron, all arranged substantially as specified.

In testimony that I claim the foregoing I have hereunto set my hand this 12th day of December, 1870.

JOHN G. SCHILLER.

Witnesses:
GEORGE A. HIME,
ROBT. B. MURRAY.